F. D. SMALL.
LEVEL.
APPLICATION FILED JAN. 11, 1919.

1,320,938.

Patented Nov. 4, 1919.

Inventor
Firman D. Small

By
Attorney

UNITED STATES PATENT OFFICE.

FIRMAN DEL SMALL, OF ATTICA, INDIANA.

LEVEL.

1,320,938.  Specification of Letters Patent.  Patented Nov. 4, 1919.

Application filed January 11, 1919. Serial No. 270,670.

*To all whom it may concern:*

Be it known that I, FIRMAN DEL SMALL, a citizen of the United States, residing at Attica, in the county of Fountain and State of Indiana, have invented new and useful Improvements in Levels, of which the following is a specification.

This invention relates to improvements in levels, designed particularly for the use of masons, carpenters and other mechanics in laying out operations.

Levels of ordinary construction are provided with a flat base on which they are intended to be supported in use. This requires that a supporting surface of adequate area be provided if none exists at the proper point, and that such surface have a perfectly level plane in order to secure proper results. If the supporting plane or surface is not level, the instrument must be brought to a level position by lifting it at one end. By this means the other end of the level is made the fulcrum or support for holding the weight of the instrument, and if the instrument is to be maintained in a fixed position it must be either held radially by the operator or the elevated end suspended. If, after the instrument has been used to take a certain level, it is to be changed or rotated to take another level from the original position noted, the center of the instrument is either raised or lowered, and consequently a second correct level cannot be taken without another adjustment.

The object of the present invention is to provide a novel type and construction of level whereby the instrument may be tilted or rotated upon a support and sighted to indicate the proper level at which a distant object should be arranged, the construction of the device also being such as to permit a series of leveling operations to be performed without the necessity of more or less laborious adjustments for each leveling action.

The invention consists of the features of construction, combination and arrangement of parts hereinafter fully described and claimed, reference being had to the accompanying drawing, in which:—

Figure 1:
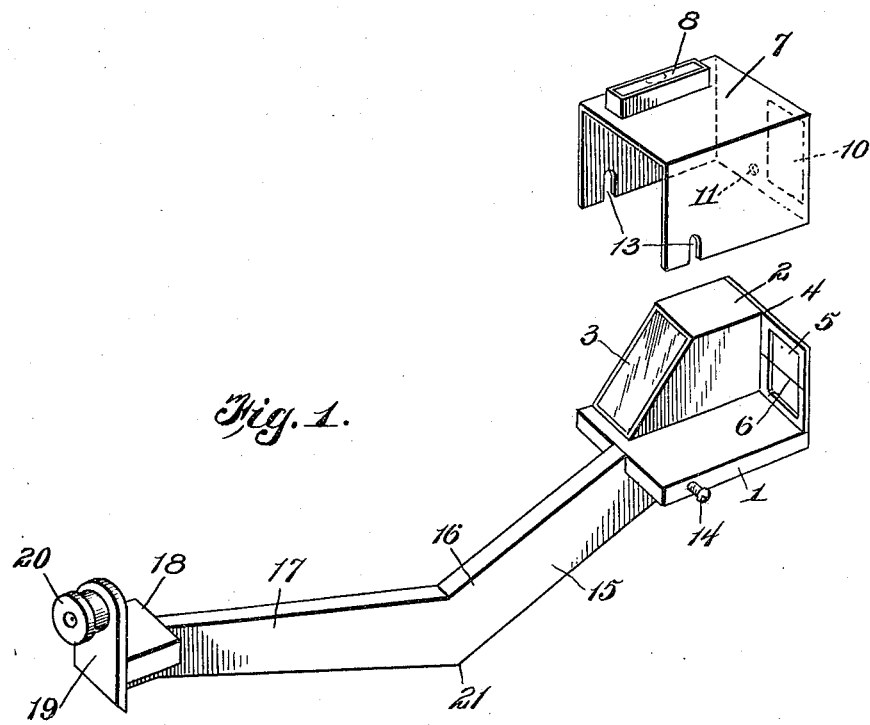
Figure 1 is a perspective view of the device with the level carrying hood removed from the level supporting plate or table.

In carrying my invention into practice, I provide a leveling instrument comprising a body or stock consisting of a table or plate 1 of square or other suitable form, upon which is mounted a block or other suitable support 2 carrying a mirror or reflector 3. The block 2 is arranged on one side of the longitudinal center of the table or plate 1 and has an inclined or sloping rear face, arranged at an angle of 45°, to which the mirror or reflector 3 is applied.

Secured to the forward transverse edge of the table or plate 1 is a front plate 4, which is suitably fastened to said plate 1 and which is provided with a sight opening 5 across which extends an indicator or sight element 6, which may be an ordinary hair line wire, secured in position in any suitable manner. The opening 5 and front sight element 6 are arranged on the opposite side of the longitudinal center of the plate 1 from the block 2 and mirror or reflector 3.

Detachably secured to the plate 1 and arranged to cover the block 2 and plate 4 is a hood 7. This is made of sheet metal or other suitable material and comprises a top wall, front wall and side walls, said hood being open at the bottom and at its inner end. The top wall of the hood 7 carries a spirit level tube 8 arranged in alinement with an opening 9 therein, said tube and opening being disposed above the mirror or reflector 3 so that the light may shine downward through the tube and opening and upon the mirror 3, in which the image of the tube and its bulb will be seen. The front wall of the hood 7 is provided with a sight opening 10 registering with the opening 5, and said wall is also provided with an opening 11 for the passage of a screw or other suitable fastening device 12, whereby such portion of the hood may be fastened to the table or plate 1. Formed in the lower edges of the side walls of the hood adjacent to the rear edges thereof are slots 13 adapted to receive and engage clamping screws 14 on the side edges of the plate 1, whereby the side walls of the hood may be adjustably fastened to the plate and secured in adjusted position. The slots 13 permit of certain ranges of vertical adjustment of the hood, after the screw 12 has been applied, to dispose the top wall and level in accurate parallelism with the surface of the plate 1, in order to set the level tube with a required degree of accuracy in a plane parallel to the plane of the surface of the plate 1.

The table 1 and parts above described are mounted upon the forward end of the arm 15 of a substantially V-shaped supporting bar 16, the other or rear arm 17 of which carries a finger piece or plate 18 and an upright 19, which upright supports a rear sight tube 20, arranged so that both the mirror surface 3 and the hair line indicator 6 may be simultaneously viewed therethrough. The arms 15 and 17 relatively converge toward each other and at their point of intersection form a fulcrum point 21 whereby the instrument may be rested upon a surface, and also tilted vertically and rotated horizontally upon said surface, to dispose the instrument for making observations at any point within the compass range about the object on which the instrument is supported, it being understood that the instrument is held in position upon the object, such as a supporting peg 22, by grasping the portions 18 and 19 between the thumb and fingers of one hand, whereby the device may be held in proper position and adjusted while the eye of the operator is applied to the rear sight tube 20 for the purpose of determining and indicating the proper level of another object arranged at a distance from the supporting object 22.

Figure 2:
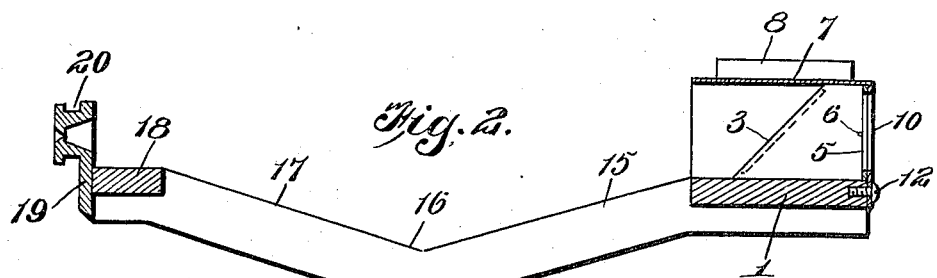
Fig. 2 is a vertical longitudinal section through the complete tool.
Figure 3:
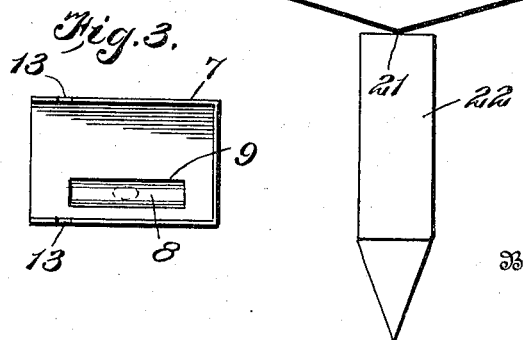
Fig. 3 is a bottom plan view of the hood.

As an example of one mode of employing the device, it is supposed that a mechanic desires to level the four corners of a building. In addition to the four corner stakes, he will drive one, the stake 22, on which to place the instrument for use. The instrument is supported upon this stake 22, as shown in Fig. 2, and pointed in the direction of one of the corner stakes. The operator then, while steadying the instrument in his hand, adjusts it until the bubble in the level tube shows that the instrument is level. The point where the projected image of the cross hair 6 falls on the corner stake is then marked by an assistant, after which the level is turned to successively point in the several directions of the different corner stakes which are marked in this way, thus completing the operation. It is to be understood that in this work the instrument is held in the hand of the operator and properly adjusted by tilting or rotating the bar 16 on the support 22, whereby the instrument may be vertically and horizontally adjusted and leveled with a minimum amount of time and effort. It is obvious that in the leveling operation the operator, looking through the rear sight 20, may simultaneously observe the front indicator 6 and the reflector 3, and the point of adjustment at which the bubble of the tube is centrally disposed to indicate a proper level, the level proper being clearly visible in the reflector, so that when a correct level is obtained the operator may indicate to his assistant the exact point where the distant stake should be marked as determined by the sight 6. It will, of course, be understood that the bar or lever 16 adapts the instrument to be placed for various operations upon a stake as described, a pile of brick, a rock or other instrument, whether level or not. The convenience of the instrument in thus obviating the necessity of employing a broad level support and enabling it to be turned or rotated to point in any direction, as well as to be held and guided in the hand of the operator, will accordingly be appreciated and its advantages in saving time and labor in laying out work readily understood.

Having thus fully described my invention, I claim:—

1. An instrument of the character described comprising a body or stock, a spirit level carried by the stock, a reflector in which the level is displayed, a front sight carried by the stock in proximity to the reflector, a member extending from the stock and forming a support on which the instrument may be vertically tilted and horizontally rotated, and a rear sight carried by said member in spaced relation to said front sight and through which the latter may be viewed.

2. An instrument of the character described comprising a body or stock, a spirit level carried by the stock, a mirror in which the spirit level is reflected, a front sight carried by the stock in proximity to the mirror, a rear sight through which the front sight may be viewed, and a connecting member between the stock and the rear sight, said connecting member having a surface forming a fulcrum point on which the instrument may be vertically tilted and horizontally rotated.

3. An instrument of the character described comprising a front supporting member, a spirit level carried thereby, a mirror in which the spirit level is reflected, a front sight carried by the front supporting member and arranged alongside of the reflector, a rear sight through which the reflector and front sight may be viewed, and an angular bar connecting the front support and rear sight, said bar forming an adjusting lever having a fulcrum point on which the instrument may be vertically tilted and horizontally rotated.

4. An instrument of the character described comprising a substantially V-shaped lever provided with a fulcrum point at the point of convergence of its arms, a reflector mounted upon one end of said lever, a spirit level carried by said end of the lever and arranged to be viewed in the reflector, a front sight carried by said end of the lever and arranged alongside the reflector, and a rear sight carried by the opposite end of the lever and through which the reflector and front sight may be simultaneously viewed.

5. A device of the character described comprising a lever having front and rear converging arms forming a fulcrum point at their point of intersection, a support upon the outer end of one of said arms, a hood adjustably and detachably secured to said support, a reflector carried by said support, a front sight carried by the support and arranged alongside the reflector, a spirit level caried by the hood and arranged to be viewed in the reflector, and a rear sight upon the outer end of the opposite arm of the lever and through which the reflector and front sight may be simultaneously viewed.

In testimony whereof I affix my signature.

FIRMAN DEL SMALL.